(12) United States Patent
Edanami

(10) Patent No.: US 6,898,298 B1
(45) Date of Patent: May 24, 2005

(54) INSTALLING POSTURE PARAMETER AUTO EXTRACTING METHOD OF IMAGING DEVICE, AND MONITORING SYSTEM USING THE IMAGING DEVICE

(75) Inventor: Takafumi Edanami, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 425 days.

(21) Appl. No.: 09/614,142

(22) Filed: Jul. 11, 2000

(30) Foreign Application Priority Data

Sep. 8, 1999 (JP) .......................................... 11-254485

(51) Int. Cl.[7] ................................................. G06K 9/00
(52) U.S. Cl. ..................................................... 382/104
(58) Field of Search ................................. 382/104, 103, 382/933; 340/436, 903, 937; 348/118

(56) References Cited

U.S. PATENT DOCUMENTS

| 3,882,268 | A | * | 5/1975 | Ogawa et al. ............... | 348/148 |
| 5,521,633 | A | * | 5/1996 | Nakajima et al. ............ | 348/118 |
| 5,734,337 | A | * | 3/1998 | Kupersmit ................... | 340/937 |
| 6,218,960 | B1 | * | 4/2001 | Ishikawa et al. ............. | 340/901 |
| 6,445,809 | B1 | * | 9/2002 | Sasaki et al. ................ | 382/104 |

FOREIGN PATENT DOCUMENTS

| JP | 05014792 A | 1/1993 | .......... H04N/5/232 |
| JP | 09093472 A | 4/1997 | .......... H04N/5/225 |

* cited by examiner

*Primary Examiner*—Leo Boudreau
*Assistant Examiner*—Tom Lu
(74) *Attorney, Agent, or Firm*—Staas & Halsey LLP

(57) ABSTRACT

A monitoring system using an imaging device like a TV camera, etc. enhances a monitoring accuracy without involving manual operations and increasing costs for installing the monitoring system. Two lengths of linear components parallel to each other are extracted from data of an image taken by the imaging device. A rotational angle and an elevation angle of the imaging device are calculated from a positional relationship between those two lengths of linear components and a view point of the imaging device. Obtained is a ratio of a line-to-line distance between the two lengths of linear components when transforming coordinates of the two lengths of linear components on an image plane into coordinates on an imaginary plane to a line-to-line distance between the two lengths of linear components in a real space. A height of position from the plane for installing the imaging device is obtained from this ratio.

8 Claims, 8 Drawing Sheets

INSTALLING POSTURE PARAMETER AUTO EXTRACTING METHOD OF IMAGING DEVICE, AND MONITORING SYSTEM USING THE IMAGING DEVICE

BACKGROUND OF THE INVENTION

1. Filed of the Invention

The present invention relates generally to a technology of automatically extracting parameters representing a posture of installing an imaging device such as a TV camera, etc., and more particularly to a technology of automatically extracting the installing posture parameters of the imaging device used for a monitoring system.

2. Related Background Arts

Over the recent years, a variety of monitoring systems each using an imaging device typified by a TV camera have been proposed for the purpose of measuring a traffic density, specifying a traveling vehicle, measuring a speed of the traveling vehicle on the road or the railway, or specifying an object entering a predetermined site.

For example what is known as this type of monitoring system may be a monitoring system for may be a monitoring system for specifying an individual traveling vehicle by automatically recognizing characters on a number plate attached to the vehicle from an image taken by the imaging device provided, above the road, and a monitoring system for specifying a traveling speed of the vehicle by extracting a characteristic element of the traveling vehicle from the image taken by the imaging device provided above the road, and measuring a moving distance of the characteristic element within a predetermined period of time.

SUMMARY OF THE INVENTION

In the imaging device provided above the road, it is assumed that a posture, e.g. an angle of installing the imaging device body or a height of a position from the plane for installing the imaging device body might change due to influences by a wind, vibrations, etc.

If the installation posture of the imaging device changes from its initial state, there might be a case where an accuracy of recognizing characters on a number plate and an accuracy of measuring a traveling speed of a vehicle decline. Especially in the monitoring system for measuring the traveling speed of the vehicle, if the installation posture of the imaging device varies from the initial state thereof, there occurs an error between a moving distance of the vehicle within a predetermined period of time within an image taken by the imaging device and an actual moving distance of the vehicle-within the predetermined period of time, and the traveling speed of the vehicle can not be precisely measured in some cases.

Therefore, it is required that the installation posture of the imaging device be manually corrected, resulting in a problem that the operation becomes laborious. On the other hand, it is considered as one scheme that the imaging device should be firmly installed in order to prevent the change in the installation posture of the imaging device. A problem, however, arises, wherein a cost required for the installation increases.

It is a primary object of the present invention, which was devised to obviate a variety of problems given above, to provide a technology capable of enhancing an monitoring accuracy of a monitoring system using an imaging device such as a TV camera, etc. without expending labors and increasing a cost required for installing the monitoring system.

To accomplish the above object, according to one aspect of the present invention, an installing posture parameter auto extracting method of an imaging device, comprises a step of extracting two lengths of linear components parallel to each other from data of an image taken by the imaging device, and a step of extracting parameters indicating an installing posture of the imaging device on the basis of the two lengths of linear components.

According to the installing posture parameter auto extracting method of the imaging device, the parameters indicating the installing posture of the imaging device are automatically extracted based on the two lengths of linear components existing within a screen of the imaging device and parallel to each other.

Namely, in the installing posture parameter auto extracting method of the imaging device according to the present invention, the installing posture parameters of the imaging device are extracted based on the two lengths of linear components on condition that the two lengths of linear components parallel to each other are imaged within the screen of the imaging device.

The installing posture parameter auto extracting method of the imaging device may further comprises a step of calculating an installing angle of the imaging device in a horizontal direction and an installing angle thereof in a vertical direction from a positional relationship between a central point on a screen of the imaging device, a varnishing point at which the two lengths of linear components intersect each other and a view point of the imaging device.

The installing posture parameter auto extracting method of the imaging device may further comprise a step of extracting an angle made in the horizontal direction by a straight line passing through the central point and the view point and by a straight line passing through the varnishing point and the view point, as an installation angle of the imaging device in the horizontal direction, and a step of extracting an angle made in the vertical direction by the straight line passing through the central point and the view point and by the straight line passing through the varnishing point and the view point, as an installation angle of the imaging device in the vertical direction.

The installing posture parameter auto extracting method of the imaging device may further comprise a step of transforming coordinates of the two lengths of linear components on the image plane into coordinates on an imaginary plane in a real space, a step of calculating a distance between the two lengths of linear components on the imaginary plane, and a step of calculating a height of a position of installing the imaging device on the basis of a ratio of the distance between the two lengths of linear components on the imaginary plane to an actual distance of the two lengths of linear components.

According to another aspect of the present invention, a monitoring system, using an imaging device, for detecting attributes of a monitoring target object on the basis of an image taken by the imaging device, comprises a posture parameter calculating unit for extracting two lengths of linear components parallel to each other from data of the image taken by the imaging device, and calculating the posture parameters of the imaging device on the basis of the two lengths of linear components, and an attribute data converting unit for converting attribute data of the monitoring target object on an image plane into attribute data adapted to a real space on the basis of the posture parameters.

The attribute data connoted herein are data indicating, e.g., a position or a size of the monitoring target object, and a moving speed, etc. of the monitoring target object. In this case, the attribute data converting unit may convert the position or the size or the moving speed of the monitoring target object on the image plane into values adapted in a real space in accordance with the posture parameters.

DETAILED DESCRIPTION OF THE PREFERRRED EMBODIMENT

A specific embodiment of a method of automatically extracting an installing posture of an imaging device in a monitoring system according to the present invention, will hereinafter be discussed with reference to the accompanying drawings. Herein, there is exemplified a case where the auto installing posture extracting method of the present invention is applied to a vehicle traveling speed monitoring system for monitoring a speed of a vehicle traveling on the road.

Figure 1:
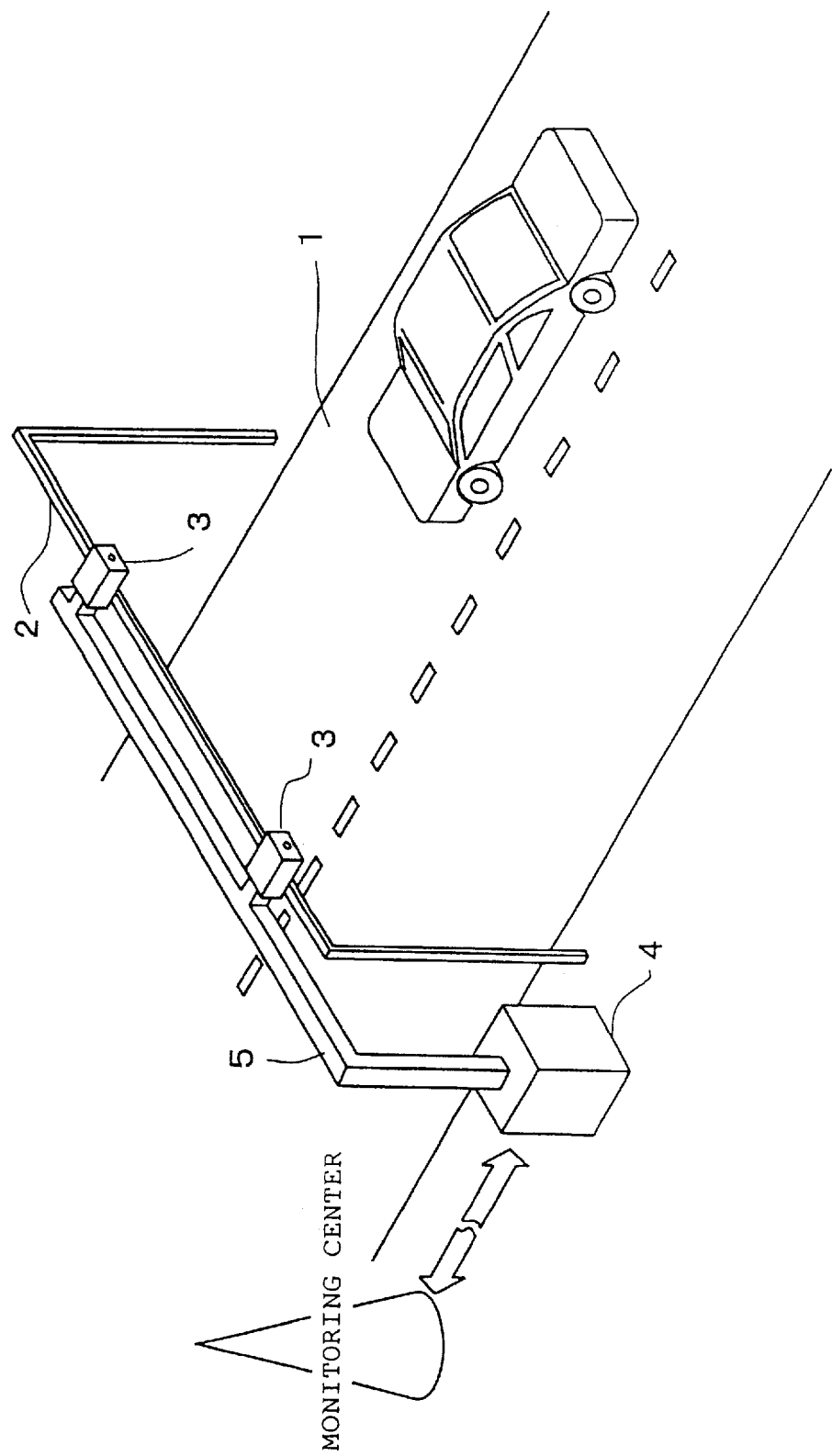
FIG. 1 is view schematically showing a configuration of a vehicle traveling speed monitoring system to which an installing posture parameter auto extracting method of an imaging device in an embodiment is applied.

FIG. 1 is a view schematically showing a configuration of the vehicle traveling speed monitoring system.

The vehicle traveling speed monitoring system includes a plurality of imaging devices 3 attached to a gate-shaped pole 2 erected from shoulders of a car road 1 in a way of extending astride of the car road 1, and an image processing device 4 disposed on the shoulder of the car road 1 and connected via a signal line 5 to each of the imaging devices 3. Note that the number of the imaging devices 3 provided is the same as the number of traffic lanes on the car road 1, and each of the imaging devices 3 is installed in a one-to-one correspondence relation with the lane.

The imaging device 3 images a vehicle traveling along the corresponding lane, converts image data obtained by the imaging process into a digital signal format from an analog signal format, and transmits the image data converted into the digital signal format to the image processing device 4 on a frame basis.

The image processing device 4 receives the image data transmitted from each of the imaging devices 3, and calculates a traveling speed of the vehicle traveling on the car road 1 by analyzing the received image data. The image processing device 4 is stored with the vehicle image data and data showing the vehicle traveling speed in a mode of making these two items of data corresponding to each other, and transmits the two items of data related to each other to an unillustrated monitoring center.

Herein, in the example shown in FIG. 1, the image processing device 4 is provided independently of the imaging device 3, and may take such a construction that the image processing device 4 is incorporated into each imaging device 3 or disposed within the monitoring center.

Specific configurations of the imaging device 3 and the image processing device 4 will hereinafter be explained.

Figure 2:
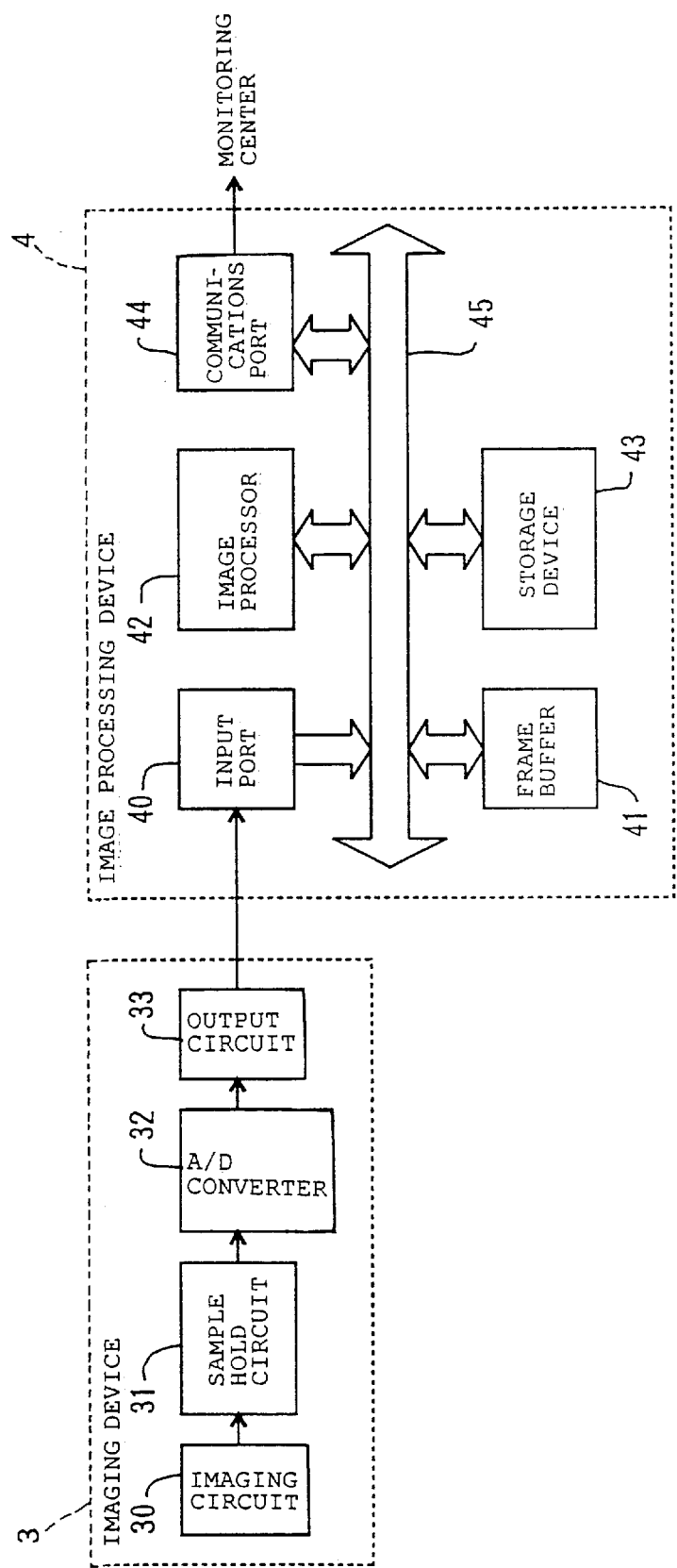
FIG. 2 is a diagram showing a hardware architecture of the vehicle traveling speed monitoring system.

FIG. 2 is a diagram showing a hardware architecture of the imaging device 3 and the image processing device 4. The imaging device 3 includes an imaging circuit 30, a sample hold circuit 31, and A/D converter 32 and an output circuit 33.

The imaging circuit 30 is constructed of a solid-state imaging device having a light receiving unit composed of, e.g., a photo diode, and a transferring unit composed of a CCD shift register. The imaging circuit 30 converts an optical signal received by the light receiving unit into an electric signal in the analog signal format, and thus outputs the electric signal.

The sample hold circuit 31 segments the analog electric signal outputted from the imaging circuit 30 on a one-picture basis, and thus outputs the segmented electric signals.

The A/D converter 32 is a circuit for converting the analog electric signal outputted from the sample hold circuit 31 into the digital electric signal by executing a sampling process and a quantizing process on the analog electric signal.

The output circuit 33 outputs, to the image processing device 4, the image data in the digital signal format, which are outputted from the A/D converter 32.

Next, the image processing device 4 includes an input port 40, a frame buffer 41, an image processor 42, a storage device 43 and a communications port 44, which are connected to each other via a bidirectional bus 45.

The input port 40 is a circuit for receiving the digital image data transmitted from the imaging device 3, and inputting the received image data to the frame buffer 41 via the bidirectional bus 45.

The frame buffer 41 is a circuit for storing, on the frame basis, the digital image data inputted via the input port from the imaging device 3.

The storage device 43 constructed of a hard disk device, etc. stores the image data of a monitoring target vehicle in relation to the data indicating the vehicle traveling speed.

The communications port 44 is a circuit for transmitting, to the monitoring center, e.g., the data about the monitoring target vehicle and the data indicating the vehicle traveling speed as well as being a device for transmitting and receiving the data to and from the monitoring center.

The image processor 42 is a circuit for calculating a traveling speed of the monitoring target vehicle by analyzing the digital image data stored in the frame buffer 41, then storing the storage device 42 with the data indicating the vehicle traveling speed and the image data thereof in a way of being related to each other, and transmitting the vehicle traveling speed data and the image data thereof to the monitoring center via the communications port 44.

Moreover, in accordance with this embodiment, the image processor 42 extracts parameters indicating an installing posture of the imaging device 3, and corrects a procedure of calculating the vehicle traveling speed on the basis of the extracted parameters.

Figure 3:
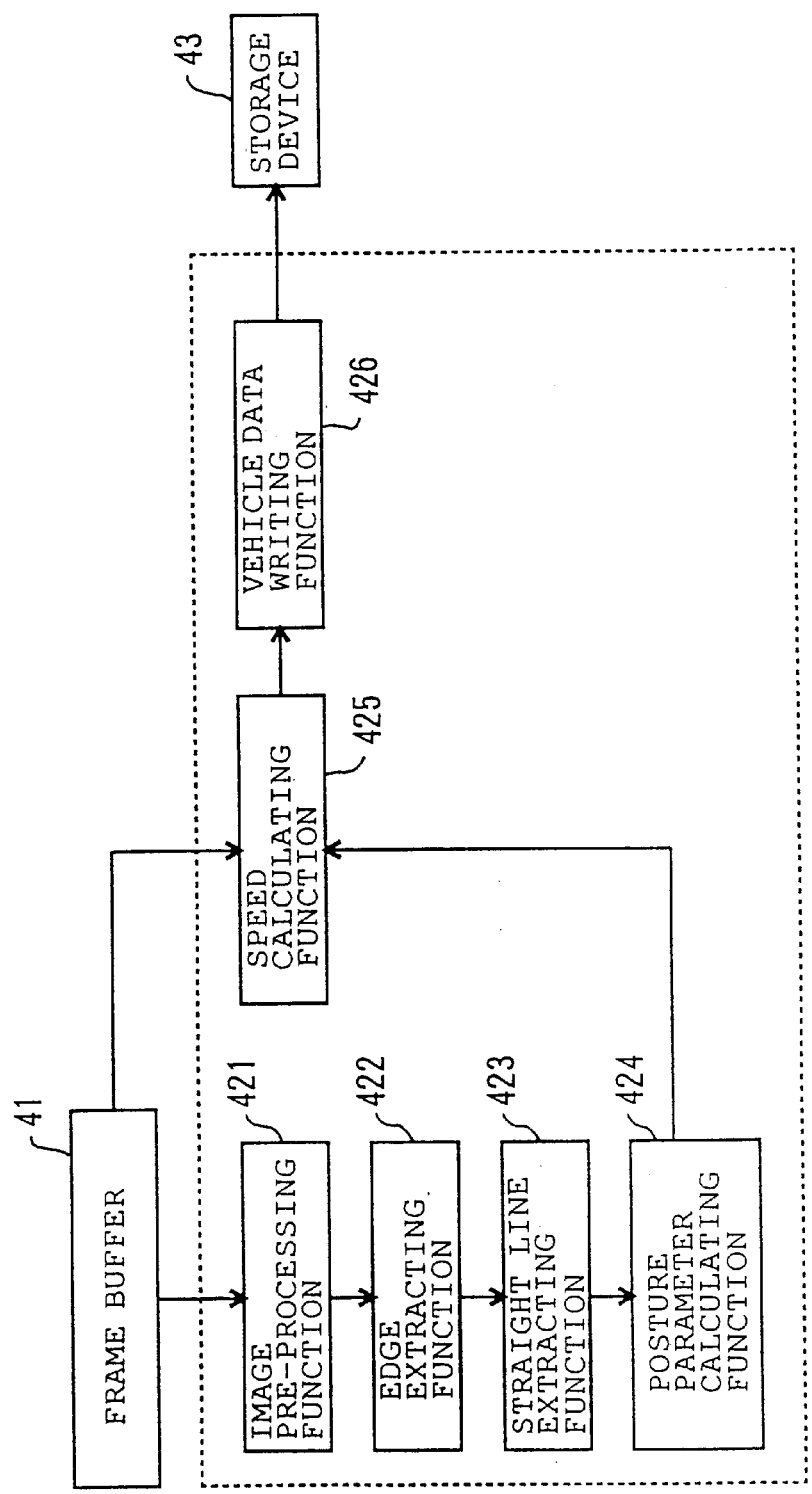
FIG. 3 is an explanatory block diagram showing functions of an image processor.

Herein, functions actualized by the image processor 42 in this embodiment will be explained referring to FIG. 3. FIG.

3 is a block diagram showing the functions actualized by the image processor 42.

The functions actualized by the image processor 42 in this embodiment may be exemplified by an image pre-processing function 421, an edge extracting function 422, a straight line extracting function 423, a posture parameter calculating function 424, a speed calculating function 425 and a vehicle data writing function 426.

[Image Pre-Processing Function 421]

The image preprocessing function 421 is defined as a function of executing image pre-processes including a contrast enhancing process, a noise removing process typified by a smoothing process and a process of correcting a geometrical distortion to the digital image data stored in the frame buffer 41.

[Edge Extracting Function 422]

The edge extracting function 422 is a function of extracting dots (pixels) forming an outline of an object imaged out of the frame data receiving the execution of the image preprocessing. The edge extracting function 422 extracts the outline dots by using the differential operators such as Sobel operator, Laplacian operator.

The straight line extracting function 423 is a function of extracting two lengths of linear components existing within an image plane (two-dimensional coordinate system) by utilizing the outline dots extracted by the edge extracting function 422. It is preferable that the two lengths of linear components have characteristics of existing all the times on the image plane and, besides, being parallel to each other in a real space and being invariable in terms of a distance between the two straight lines. These linear components may be, e.g., shoulders positioned at both of side ends of the road 1, or the one-sided shoulder of the road 1 and a centerline. An assumption in this embodiment is that the one-sided shoulder of the road and the center line be used as the two lengths of linear components.

The straight line extracting function 423 is a function of extracting coordinates of a straight line L0 representing the shoulder on the image plane (two dimensional coordinate axis) and coordinates of a straight line L1 representing the center line by use of the outline dots extracted by the edge extracting function 422.

To be more specific, the straight line extracting function 423 picks up n-pieces of outline dots from a group of the outline dots representing the shoulder which have been extracted by the edge extracting function 422, and calculates a straight line interpolation coefficient with respect to these n-pieces of outline dots by the least square method. Then, the straight line extracting function 423 picks up n-pieces of outline dots from a group of the outline dots representing the center line, and calculates a straight line interpolation coefficient with respect to these n-pieces of outline dots by the linear regression method (least square method).

More specifically, the straight line extracting function 423, to begin with, arbitrarily selects the n-pieces of outline dots (x0, y0) (x1, y1) (x2, y2), . . . , (xn−1, yn−1) out of the group of outline dots representing the shoulder, and calculates such a straight line as to minimize a square cumulative error among straight lines passing through those n-pieces of dots. Herein, when coordinates y of the straight line passing through the n-pieces of dots are given by y=a0x+b0, a square cumulative error E can be expressed by the formula 1:

[Formula 1]

$$E=\Sigma((a0x_i+b0)-y_i)^2$$

In the case of calculating (a0, b0) by which the square cumulative error E is minimized, it follows that there are performed calculations in the following simultaneous equations as shown in the formula 2.

[Formula 2]

$$na0+(\Sigma x_i)b0=\Sigma y_i$$

$$(\Sigma x_i)+(\Sigma x_i^2)b0=\Sigma x_i y_i$$

On this occasion, the straight line extracting function 423 calculates $\Sigma x_i$, $\Sigma y_i$, $\Sigma x_i^2$, $\Sigma x_i y_i$ with respect to all n-pieces of outline dots representing the shoulder, and calculates a value of (a0, b0) by which the square cumulative error E is minimized by substituting a result of the above calculation into the simultaneous equations given above.

On the other hand, the straight line extracting function 423 arbitrarily picks up n-pieces of dots (x'0, y'0)(x'1, y'1) (x'2, y'2), . . . , (x'n−1, y'n−1) out of the group of outline dots representing the centerline, and calculates such a straight line as to minimize a square cumulative error among straight lines passing through those n-pieces of dots. Herein, when coordinates y of the straight line passing through the n-pieces of dots are given by y'=a1x'+b1, a square cumulative error E' can be expressed by the formula 3:

[Formula 3]

$$E=\Sigma((a1x'_i+b1)-y'_i)^2$$

In the case of calculating (a1, b1) by which the square cumulative error E' is minimized, it follows that there are conducted calculations in the following simultaneous equations as shown in the formula 4.

[Formula 4]

$$Na1+(\Sigma x'_i)b1=\Sigma y'_i$$

$$(\Sigma x'_i)+(\Sigma x'_i^2)b1=\Sigma x'_i y'$$

On this occasion, the straight line extracting function 423 calculates $\Sigma x'_i$, $\Sigma y'_i$, $\Sigma x'_i^2$, $\Sigma x'_i y'_i$ with respect to all n-pieces of outline dots representing the center line, and calculates a value of (a1, b1) by which the square cumulative error E is minimized by substituting a result of the above calculation into the simultaneous equations given above.

As a result, there are obtained the coordinates y=a0x+b0 of the straight line L0 representing the shoulder and the coordinates y'=a1x'+b1 of the straight line L1 representing the center line.

[Posture Parameter Calculating Function 424]

The posture parameter calculating function 424 is a function of calculating parameters representing an installation posture of the imaging device 3 on the basis of the coordinates of the two straight lines L0, L1 which have been obtained by the straight line extracting function 423. The parameters representing the installation posture of the imaging device 3 may be exemplified by an angle (rotational angle) of the imaging device 3 in the horizontal direction, an angle (elevation angle) in the vertical direction and a height of the imaging device 3.

Figure 4:
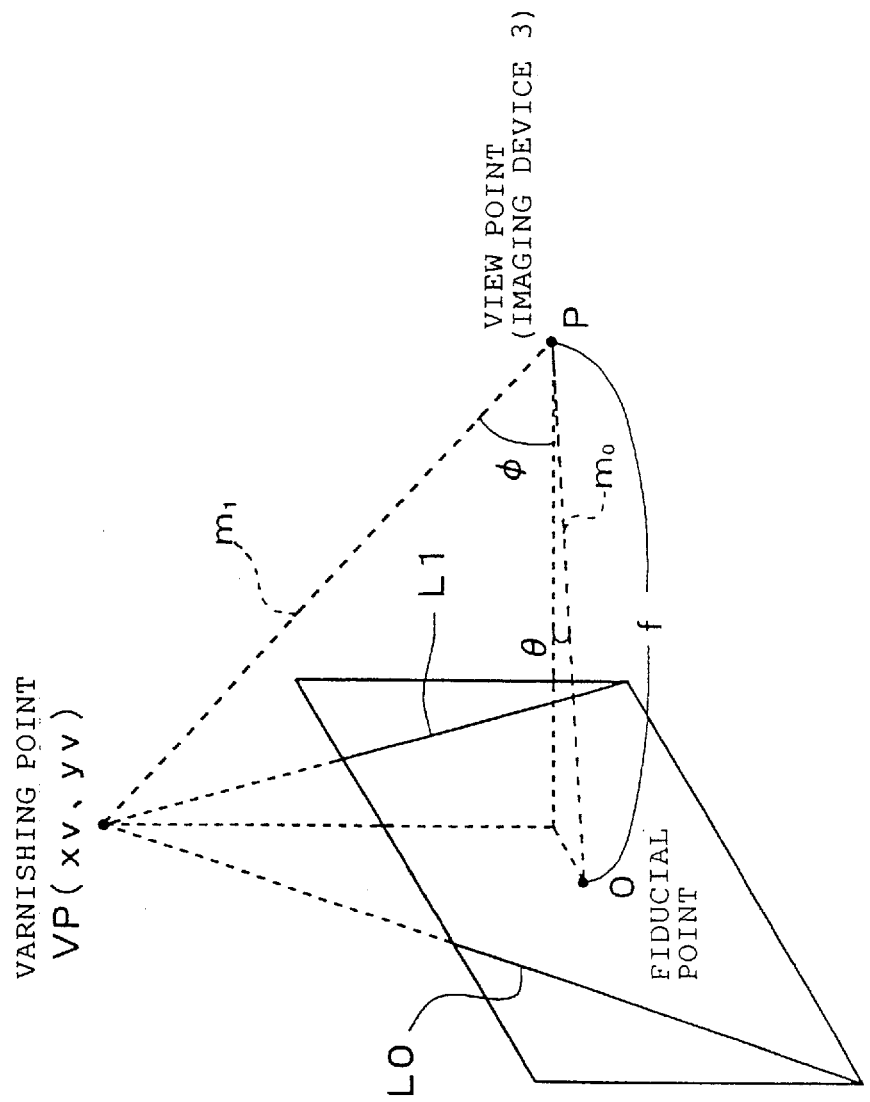
FIG. 4 is an explanatory diagram showing a method of extracting a rotational angle and an elevation angle of the imaging device.

Methods of calculating the rotational angle and the elevation angle of the imaging device 3 will be explained with reference to FIG. 4.

When obtaining the rotational angle and the elevation angle, the posture parameter calculating function 424, to start with, obtains coordinates of a so-called varnishing point VP, i.e., the point which the two straight lines L0, L1 obtained by the straight line extracting function 423 intersect each other.

Herein, let the coordinates of the varnishing point VP be (xv, yv), the coordinates (xv, yv) are expressed by equations shown in the following formula 5:

[Formula 5]

$$xv=(b1-b0)/(a0-a1)$$

$$yv=a1\cdot(b1-b0)/(a0-a1)+b1$$

Subsequently, the posture parameter calculating function 424, based on the assumption that a point (a central point on the screen in the example shown in FIG. 4) corresponding to an origin in the two dimensional coordinate system on the screen serve as a fiducial point O), calculates an angle made by a straight line m0 connecting the fiducial point O to a position (a view point) of the imaging device 3 and a straight line m1 connecting the view point P to the varnishing point VP, i.e., an angle θ made by the straight line m0 and the straight line m1 in their horizontal direction, and also an angle φ made by the straight line m0 and the straight line m1 in their vertical direction.

The angle θ made by the straight lines m0 and m1 in their horizontal direction and the angle φ made by the straight lines m0 and m1 in their vertical direction, are obtained by equations given in the following formula 6:

[Formula 6]

$$\theta=\tan^{-1}(xv/f)$$

$$\phi=\tan^{-1}(yv/f)$$

where f is a focal length of the imaging device 3.

The posture parameter calculating function 424 stores an unillustrated predetermined storage circuit with the angle θ obtained in the above calculation formula as a rotational angle of the imaging device 3 and the angle φ obtained in the above calculation formula as an elevation angle of the imaging device 3.

Next, the method of calculating the height of the imaging device 3 will be explained referring to FIG. 5. When calculating the height of the imaging device 3, the posture parameter calculating function 424 generates a transformation matrix for transforming the two dimensional coordinate system on the image plane into a three dimensional coordinate system in the real space by use of the rotational angle θ and the elevation angle φ.

On this occasion, let Q' (x', y', z') be a point obtained by transforming an arbitrary point Q(u, v) of the two dimensional coordinate system (u, v) on the image plane into a three dimensional coordinate system (x, y, z) on the basis of a direction of line of sight, and a transformation matrix for performing a rotational transform in y- and x-axis directions, is generated. In this case, a specific structure of the transformation matrix may be expressed as shown in the formula 7:

$$\begin{bmatrix}x'\\y'\\z'\end{bmatrix}=\begin{bmatrix}\cos\theta & \sin\theta & 0\\-\sin\theta & \cos\theta & 0\\0 & 0 & 1\end{bmatrix}\begin{bmatrix}-\sin\phi & 0 & \cos\phi\\0 & 1 & 0\\\cos\phi & 0 & \sin\phi\end{bmatrix}\begin{bmatrix}f\\u\\v\end{bmatrix}+\begin{bmatrix}x0\\y0\\z0\end{bmatrix}\quad\text{[Formula 7]}$$

where $$\theta=\cos^{-1}(x0/(x0^2+y0^2)^{1/2}),$$

$$\phi=\cos^{-1}((x0^2+y0^2)^{1/2}/r),$$

$$r=(x0^2+y0^2+z0^2)^{1/2}$$

Note that x0, y0 and z0 be assumed to express the coordinates (x0, y0, z0) of the view point P in the three-dimensional coordinate system.

The transformation matrix as expressed above indicates a quantity of rotation of the optical axis of the imaging device 3 through between the x-axis and the y-axis of the road 1, and may be defined as a matrix indicating the rotation about the x-axis and the rotation about the y-axis, respectively.

Figure 5:
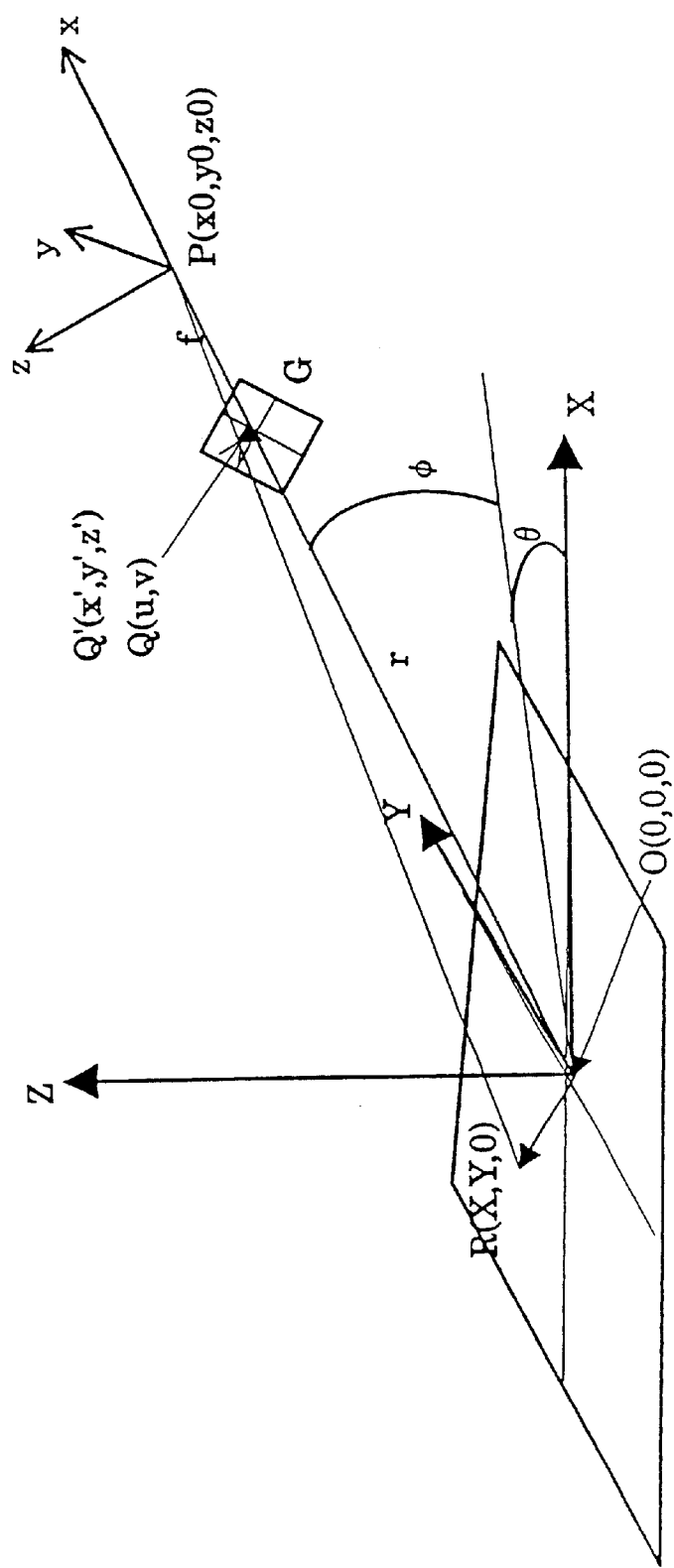
FIG. 5 is an explanatory diagram showing a method of transforming coordinates on an image plane into coordinates on an imaginary plane in a real space.
Figure 6:
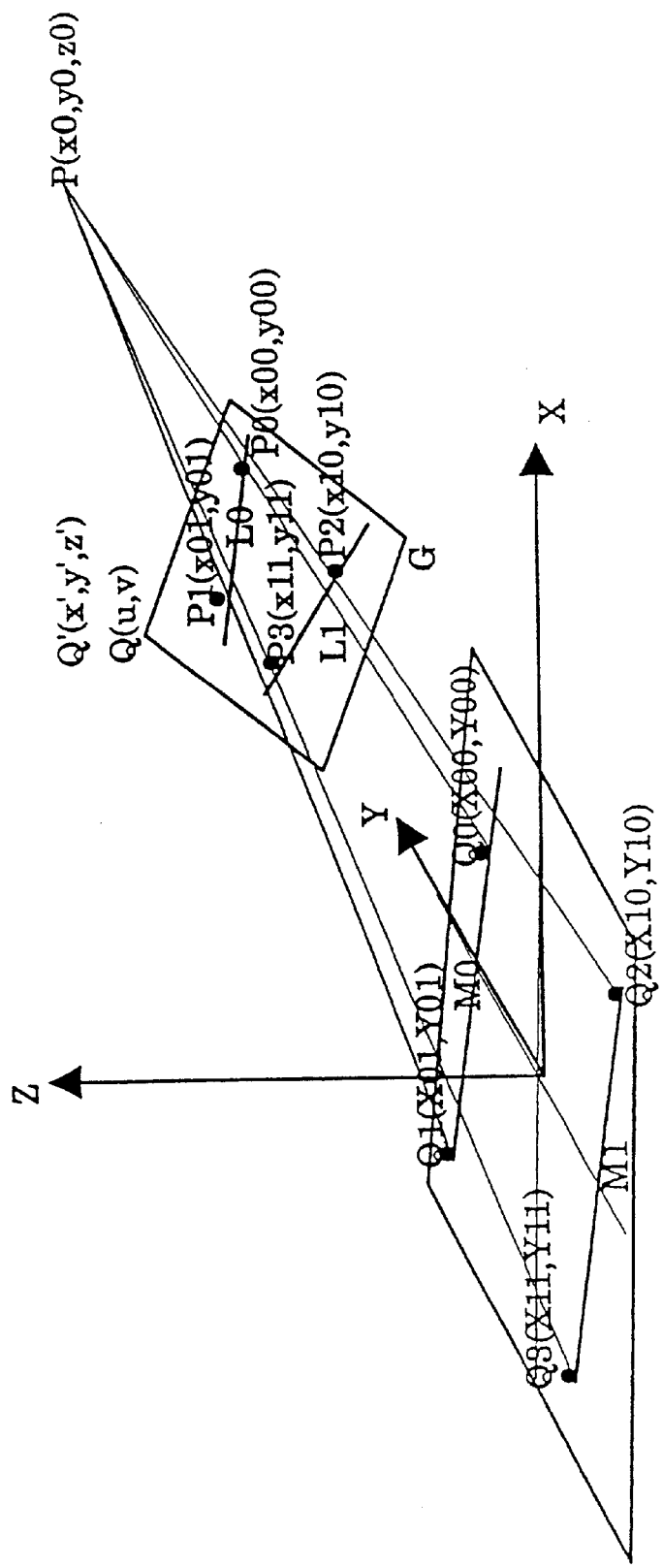
FIG. 6 is an explanatory diagram showing a method of transforming coordinates of two lengths of linear components on the image plane into coordinates on the imaginary plane in the real space.

Herein, let z0 (which may be set to "1" for simplicity) be a height of the imaging device 3 in the three dimensional coordinate system in the real space, referring to FIG. 5. A point R(x, y, 0) at which the straight line passing through the view point P and the point Q on the image plane intersects the x-y plane in the real space, is a point where Q is mapped in the real space, and hence the straight line passing through the points P and Q can be expressed in the formula 8:

$$\begin{bmatrix}x\\y\\0\end{bmatrix}=k\begin{bmatrix}x'-x0\\y'-y0\\z'-z0\end{bmatrix}+\begin{bmatrix}x0\\y0\\z0\end{bmatrix}\quad\text{[Formula 8]}$$

In this case, under a condition of z=0, a parameter k of the straight line passing through the points P and Q becomes z0/(z0−z'), and, as a result, coordinates of the point R can be obtained by equations shown in the formula 9:

[Formula 9]

$$x=(z0/(z0-z'))\cdot(x'-x0)+x0$$

$$y=(z0/(z0-z'))\cdot(y'-y0)+y0$$

The posture parameter calculating function 424 maps two lengths of linear components L0, L1 on the image plane onto the real space by use of the mapping method described above. To be specific, the posture parameter calculating function 424 maps, onto the real space, arbitrary two points P0(x00, y00) and P0(x01, y01) on the straight line L0 representing the shoulder on the image plane by using the above formula. The posture parameter calculating function 424 also maps, onto the real space, arbitrary two points P2(x10, y10) and P3(x11, y11) on the straight line L1 representing the center line on the plane of the screen by using the above formula.

Supposing that Q0(X00, Y00), Q1(X01, Y01), Q2(X10, Y10) and Q3(X11, Y11) be point coordinates when four points P0(x00, y00), P1(x01, y01), P2(x10, y10) and P3 (x11, y11) on the image plane are mapped onto the real space, Q0, Q1, Q2 and Q3 can be expressed by equations shown in the formula 10:

$$Q0:\begin{bmatrix}X00\\Y00\end{bmatrix}=\begin{bmatrix}(z0/(z0-z'))\cdot(x00-x0)+x0\\(z0/(z0-z'))\cdot(y00-y0)+y0\end{bmatrix}\quad\text{[Formula 10]}$$

$$Q1:\begin{bmatrix}X01\\Y01\end{bmatrix}=\begin{bmatrix}(z0/(z0-z'))\cdot(x01-x0)+x0\\(z0/(z0-z'))\cdot(y01-y0)+y0\end{bmatrix}$$

$$Q2:\begin{bmatrix}X10\\Y10\end{bmatrix}=\begin{bmatrix}(z0/(z0-z'))\cdot(x10-x0)+x0\\(z0/(z0-z'))\cdot(y10-y0)+y0\end{bmatrix}$$

$$Q3:\begin{bmatrix}X11\\Y11\end{bmatrix}=\begin{bmatrix}(z0/(z0-z'))\cdot(x11-x0)+x0\\(z0/(z0-z'))\cdot(y11-y0)+y0\end{bmatrix}$$

Subsequently, the posture parameter calculating 424 calculates coordinates of a straight line M0 passing through the points Q0 and Q1 in the real space, and also calculates coordinates of a straight line M1 passing through the points Q2 and Q3 in the real space. The coordinates of these straight lines M0, M1 can be obtained by equations shown in the formula 11:

$$M0: \begin{bmatrix} X \\ Y \end{bmatrix} = \begin{bmatrix} X00 - X01 \\ Y00 - Y01 \end{bmatrix} k1 + \begin{bmatrix} X00 \\ Y00 \end{bmatrix}$$ [Formula 11]

$$M1: \begin{bmatrix} X \\ Y \end{bmatrix} = \begin{bmatrix} X10 - X11 \\ Y10 - Y11 \end{bmatrix} k2 + \begin{bmatrix} X10 \\ Y10 \end{bmatrix}$$

The thus obtained two straight lines M0, M1 represent straight lines when the straight lines L0, L1 on the image plane are mapped onto the real space.

The posture parameter calculating function 424 obtains a line-to-line distance T between the two straight lines M0 and M1 described above. A method of obtaining the line-to-line distance T may be exemplified such as obtaining a distance in the vicinity of the origin (a point at which the center of the image plane extends and intersects a plane of Z=0) of the real space coordinate system. In this case, the line-to-line distance T can be given by the formula 12:

$T = [\{-X01/(X00-X01)\} \cdot (Y00-Y01)+Y00] - [\{-X10/(X10-X11)\} \cdot (Y10-Y11)+Y10] \cdot C^{1/2} C = 1/[1+(X00-X01)/(Y00-Y01)^2]$ The line-to-line distance T indicates a line-to-line distance when the two straight lines on the image plane are mapped onto a imaginary plane (lower by Z0 than the imaging device 3) in the real space, and a relationship shown in the formula 13 is established.

[Formula 13]

$H/Z0 = W/T$ where W is an actual distance between the shoulder and the center line, and H is an actual height of the imaging device 3.

As a result, from the equation shown in the formula 13, the actual height H can be given such as $H = Z0 \cdot (W/T)$.

Herein, referring back to FIG. 3, the posture parameter calculating function 424 notifies the speed calculating function 425 of the three parameters such as the rotational angle $\theta$, the elevation angle $\phi$ and the height H which have been obtained by the methods described above.

[Speed Calculating Function 425]

The speed calculating function 425 is a function of calculating a traveling speed of the monitoring target vehicle on the basis of the image data stored in the frame buffer 41. More specifically, the speed calculating function 425 calculates coordinates of a start point and coordinates of an end point when the monitoring target vehicle moves in a predetermined time t on the image plane. The speed calculating function 425 transforms the coordinates of the start and end points on the image plane into coordinates in the real space, and calculates a distance (a vehicle moving distance 1) from the start point to the end point in the real space by use of the three parameters (the rotational angle $\theta$, the elevation angle $\phi$ and the height H) calculated by the posture parameter calculating function 424. The speed calculating function 425 calculates a traveling speed of the monitoring target vehicle by dividing the vehicle moving distance 1 by the predetermined time t.

The speed calculating function 425 notifies the vehicle data writing function 426 of the calculated traveling speed and the image data of the monitoring target vehicle.

[Vehicle Data Writing Function 426]

The vehicle data writing function 426 is categorized as a function of storing the storage device 43 with the image data and the data indicating the traveling speed in a way of being related to each other, of which the speed calculating function 425 has notified.

An operation and an effect in the embodiment will hereinafter be described.

Figure 7:
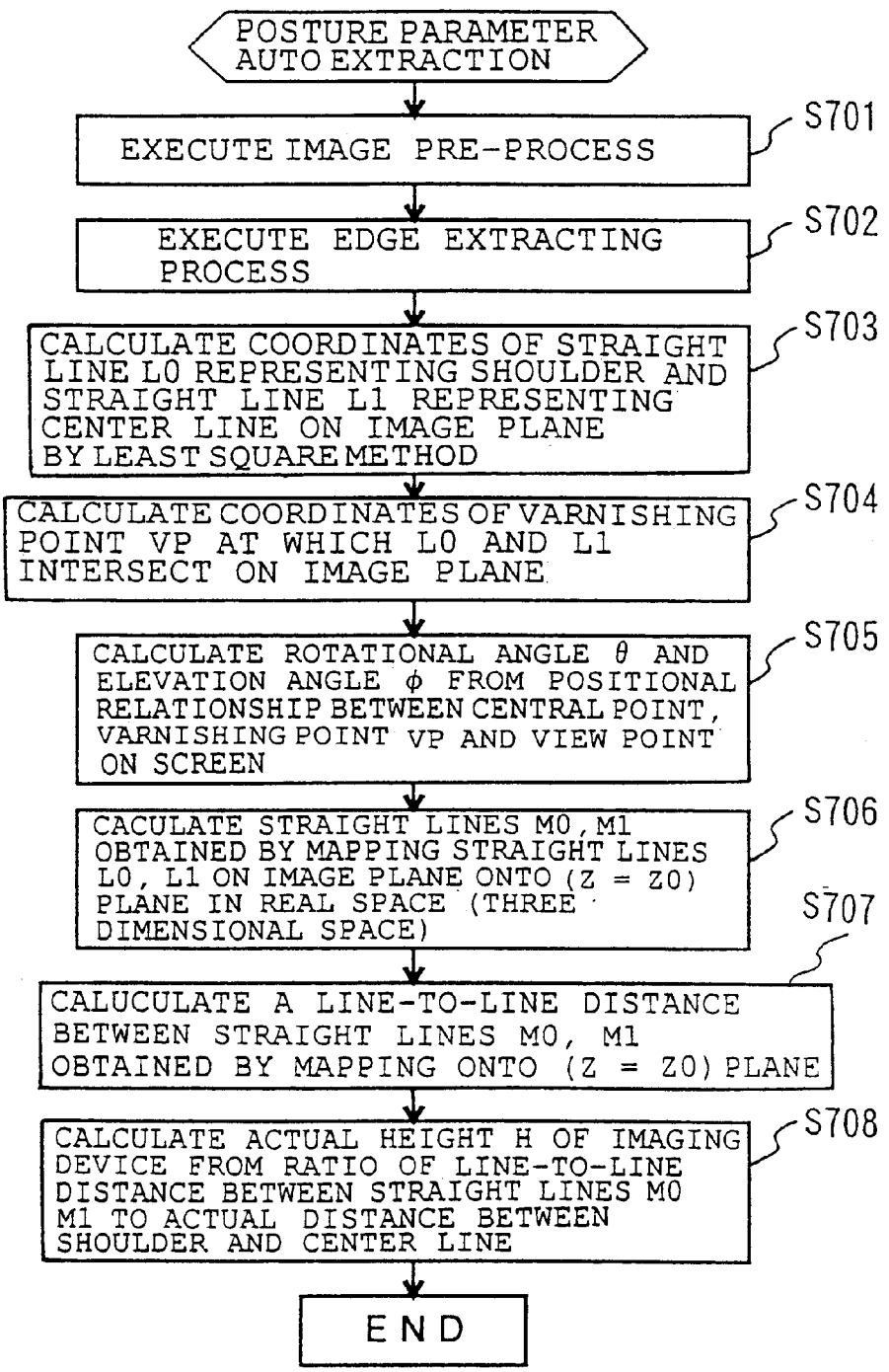
FIG. 7 is a flowchart showing a posture parameter auto extraction routine.

FIG. 7 is a flowchart showing a posture parameter auto extraction routine. The posture parameter auto extraction routine is executed by the image processor 42 at an interval of a predetermined period (e.g., once a day) when and after installing the imaging device 3.

In the posture parameter auto extraction routine, the image processor 42, at first in S701, executes pre-processes such as enhancing a contrast, removing noises and correcting a geometrical distortion with respect to the image data stored in the frame buffer 41.

In S702, the image processor 42 executes an edge extracting process of extracting the outline dots from the image data by making the differential operators such as Sobel operator, Laplacian operator function.

In S703, the image processor 42 calculates the linear interpolation coefficient of outline dots extracted in S702 by the least square method, thereby calculating the coordinates of the straight line L0 representing the shoulder of the road 1 and of the straight line L1 representing the center line thereof on the image plane.

In S704, the image processor 42 calculates the coordinates of the varnishing point VP at which the two straight lines L0, L1 intersect each other in the two dimensional coordinate system containing the image plane.

In S705, the image processor 42, based on a positional relationship between the central point on the screen, the varnishing point VP and the viewpoint (the position of the imaging device 3), calculates the rotational angle $\theta$ and the elevation angle $\phi$ of the imaging device 3. Namely, the image processor 42 calculates the angle (the rotational angle $\theta$) made in the horizontal direction by the straight line passing through the central point and the viewpoint and by the straight line passing through the varnishing point VP and the view point, and also the angle (the elevation angle $\phi$) made in the vertical direction by the same straight lines.

In S706, the image processor 42, assuming that the height Z of the imaging device 3 in the real space coordinate system (the three dimensional coordinate system) be given such as Z=Z0, calculates coordinates of the two straight lines M0, M1 obtained by mapping the two straight lines L0, L1 on the image plane onto the plane defined by Z=Z0 in the real space coordinate system.

In S707, the image processor 42 calculates a line-to-line distance between the two straight lines M0, M1 obtained by mapping L0, L1 onto the (Z=Z0) plane in the real space coordinate system.

In S708, the image processor 42 calculates a real height H of the imaging device 3 from a ratio of the line-to-line distance between the straight lines M0, M1 on the (Z=Z0) plane in the real space to an actual line-to-line distance between the straight lines M0, M1 (an actual distance between the shoulder and the center line). The image processor 42 finishes the execution of this routine upon finishing the process of S708.

Figure 8:
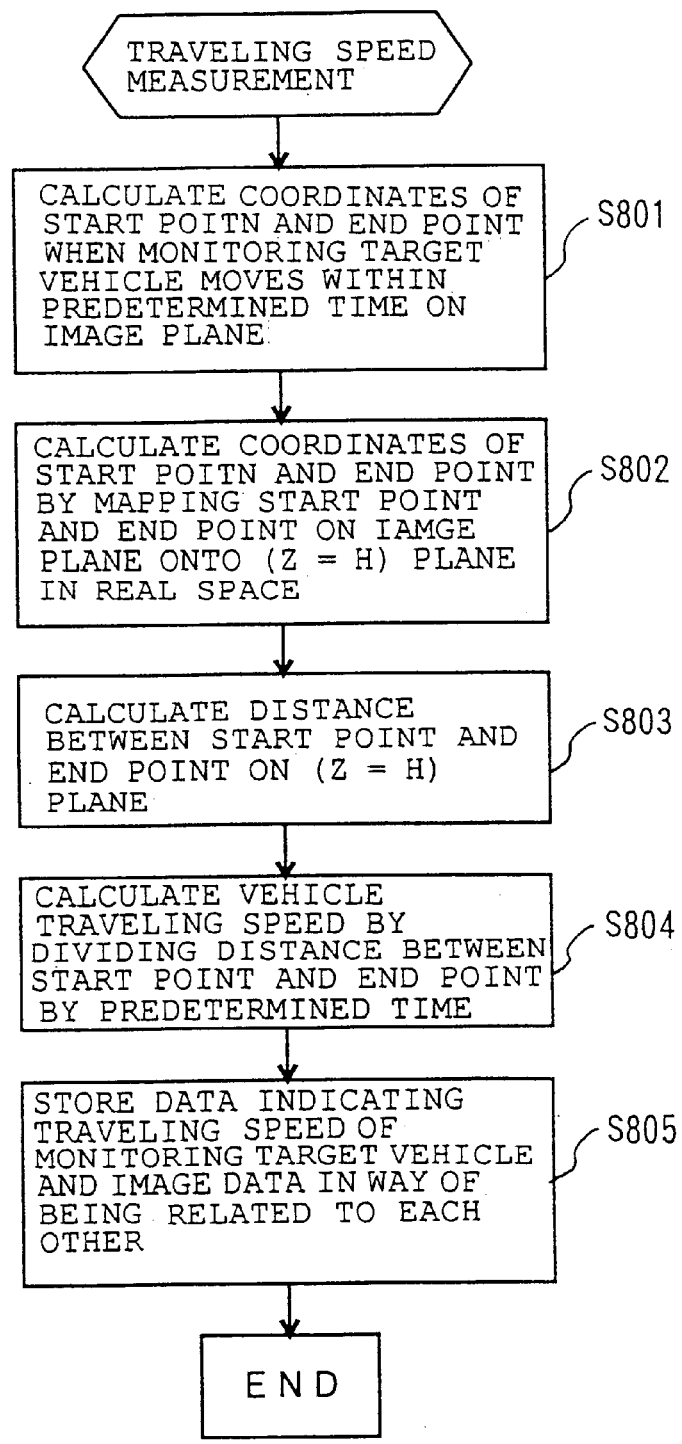
FIG. 8 is a flowchart showing a traveling speed measurement routine.

Next, the image processor 42 executes a traveling speed measurement routine as shown in FIG. 8 in order to calculate a traveling speed of the monitoring target vehicle.

In the traveling speed execution routine, the image processor 42, at first in S801, calculates coordinates of a start point and an end point when the monitoring target vehicle moves within the predetermined time t, from the image data stored in the frame buffer 41.

In S802, the image processor 42 transforms the coordinates of the start and end points which have been calculated in S801 into coordinates on a real-space plane defined by Z=H, and calculates coordinates of the start point and the end point in the real space by use of the posture parameters (the rotational angle θ, the elevation angle φ and the height H) of the imaging device 3 which have been calculated when executing the posture parameter auto extraction routine.

In S803, the image processor 42 calculates the distance between the start point and the end point on the (Z=H) plane, from the coordinates of the start and end points which have been calculated in S802.

In S804, the image processor 42 divides the distance, between the start and end points, calculated in S803 by the predetermined time, thus calculating the traveling speed of the monitoring target vehicle.

In S805, the image processor 42 stores the storage device 43 with the monitoring target vehicle traveling speed calculated in S804 and the image data of the monitoring target vehicle.

The image processor 42, upon finishing the execution of the process in S805, comes to a temporary end of executing this routine.

As discussed above, in accordance with this embodiment, the parameters indicating the posture of installation of the imaging device 3 can be automatically extracted based on the actual line-to-line distance between the straight line representing the shoulder and the straight line representing the center line, and hence the user may simply input only the distance between the shoulder and the center line. User's labors for maintenance and management are thereby relieved.

Further, in this embodiment, when installing the imaging device 3, the posture parameter calculating function automatically extracts the parameters indicating the posture of installation of the imaging device. Consequently, the installer has no necessity for minutely setting the posture of installing the imaging device 3, and it is feasible to obtain an excellent effect capable of relieving a burden on the installer.

On the other hand, according to the monitoring system exemplified in this embodiment, the traveling speed of the monitoring target vehicle is calculated based on the parameters indicating the posture of installation of the imaging device 3, so that the traveling speed of the monitoring target vehicle is precisely measured even if the installing posture of the imaging device 3 might change due to influences by vibrations and a wind.

Note that this embodiment has exemplified the case where the present invention is applied to the system for measuring the traveling speed of the vehicle traveling on the road. The present invention is not, however, as a matter of course, limited to this system and may be applied to a system for monitoring a train traveling on a railway and a system for monitoring an object entering a building and the premises.

In the installing posture parameter auto extracting method of the imaging device according to the present invention, the installing posture parameters of the imaging device are automatically extracted on condition that the two lengths of linear components parallel to each other exist within the image taken by the imaging device. Therefore, even if the installing posture of the imaging device might change due to the influences by the vibrations and the wind, there is no necessity for manually adjusting the installing posture and inputting the parameters indicating the installing posture.

Next, in the monitoring system using the imaging device according to the present invention, the parameters indicating the installing posture of the imaging device are extracted base don the two lengths of linear components parallel to each other existing within the image taken by the imaging device. Based on the posture parameters, the attribute data of the monitoring target object on the image plane are converted into the attribute data adapted to the real space, and hence, even if the installing posture of the imaging device might change, the attributes of the monitoring target object can be accurately detected.

What is claimed is:

1. An installing posture parameter auto extracting method of an imaging device, comprising:
    automatically extracting two lengths of linear components parallel to each other from data of an image taken by said imaging device;
    extracting parameters indicating an installing posture of said imaging device on the basis of the two lengths of linear components;
    transforming coordinates of the two lengths of linear components on a screen into coordinates on an imaginary plane in a real space;
    calculating a distance between the two lengths of linear components on the imaginary plane; and
    calculating a height of said imaging device on the basis of a ratio of the distance between the two lengths of linear components on the imaginary plane to an actual distance of the two lengths of linear components.

2. An installing posture parameter auto extracting method of an imaging device according to claim 1, further comprising:
    calculating an installing angle of said imaging device in a horizontal direction and an installing angle thereof in a vertical direction from a positional relationship between a central point on a screen of said imaging device, a varnishing point at which the two lengths of linear components intersect each other and a view point of said imaging device.

3. An installing posture parameter auto extracting method of an imaging device according to claim 2, further comprising: extracting an angle made in the horizontal direction by a straight line passing through the central point and the view point and by a straight line passing through the varnishing point and the view point, as an installation angle of said imaging device in the horizontal direction; and
    extracting an angle made in the vertical direction by the straight line passing through the central point and the viewpoint and by the straight line passing through the varnishing point and the view point, as an installation angle of said imaging device in the vertical direction.

4. A method of extracting installing posture parameters of an imaging device in a monitoring system for detecting attributes of a monitoring target object on the basis of an image taken by said imaging device, comprising:
    automatically extracting two lengths of linear components parallel to each other from data of the image taken by said imaging device;
    calculating the parameters indicating an installing posture of said imaging device on the basis of the two lengths of linear components;
    transforming coordinates of the two lengths of linear components on a screen into coordinates on an imaginary plane in a real space;
    calculating a distance between the two lengths of linear components on the imaginary plane;
    calculating a height said imaging device on the basis of a ratio of the distance between the two lengths of linear components on the imaginary plane to an actual distance of the two lengths of linear components; and
    converting attribute data of the monitoring target object on an image plane into attribute data adapted to a real space by using the installing posture parameters.

5. A monitoring system, using an imaging device, for detecting attributes of a monitoring target object on the basis of an image taken by said imaging device, comprising:

a posture parameter calculating unit for automatically extracting two lengths of linear components parallel to each other from data of the image taken by said imaging device, and calculating the posture parameters of said imaging device on the basis of the two lengths of linear components; a coordinate transforming unit for transforming coordinates of the two lengths of linear components on a screen into coordinates on an imaginary plane in a real space;

a distance calculating unit for calculating a distance between the two lengths of linear components on the imaginary plane;

a height calculating unit for calculating a height of said imaging device on the basis of a ratio of the distance between the two lengths of linear components on the imaginary plane to an actual distance of the two lengths of linear components; and an attribute data converting unit for converting attribute data of the monitoring target object on an image plane into attribute data adapted to a real space on the basis of the posture parameters.

6. A monitoring system using an imaging device according to claim 5, wherein the attribute data are data indicating a position or a size of the monitoring target object, and said attribute data converting unit converts the position or the size of the monitoring target object on the image plane into a position or a size in a real space in accordance with the posture parameters.

7. A monitoring system using an imaging device according to claim 5, wherein the attribute data are data indicating a moving speed of the monitoring target object, and said attribute data converting unit converts the moving speed of the monitoring target object on the image plane into a moving speed of the monitoring target object in the real space in accordance with the posture parameters.

8. A recording medium stored with a program for making a processing device execute:

automatically extracting two lengths of linear components parallel to each other from data of an image taken by an imaging device;

extracting parameters indicating an installing posture of said imaging device on the basis of the two lengths of linear components;

transforming coordinates of the two lengths of linear components on a screen into coordinates on an imaginary plane in a real space;

calculating a distance between the two lengths of linear components on the imaginary plane; and calculating a height of said imaging device on the basis of a ratio of the distance between the two lengths of linear components on the imaginary plane to an actual distance of the two lengths of linear components.

* * * * *

UNITED STATES PATENT AND TRADEMARK OFFICE
CERTIFICATE OF CORRECTION

PATENT NO. : 6,898,298 B1  
DATED : May 24, 2005  
INVENTOR(S) : Takafumi Edanami It is certified that error appears in the above-identified patent and that said Letters Patent is hereby corrected as shown below:

<u>Column 12</u>  
Line 61, after "height" insert -- of --.

Signed and Sealed this

Eleventh Day of April, 2006

JON W. DUDAS  
*Director of the United States Patent and Trademark Office*